United States Patent
Wakrat et al.

(10) Patent No.: US 8,468,293 B2
(45) Date of Patent: Jun. 18, 2013

(54) RESTORE INDEX PAGE

(75) Inventors: Nir Jacob Wakrat, Los Altos, CA (US);
Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 747 days.

(21) Appl. No.: 12/509,071

(22) Filed: Jul. 24, 2009

(65) Prior Publication Data

US 2011/0022780 A1 Jan. 27, 2011

(51) Int. Cl.
*G06F 12/00* (2006.01)
(52) U.S. Cl.
USPC ............................ 711/103; 711/154; 711/207
(58) Field of Classification Search
USPC .......................................... 711/103, 154, 207
See application file for complete search history.

(56) References Cited

U.S. PATENT DOCUMENTS

| | | |
|---|---|---|
| 4,323,987 A | 4/1982 | Holtz et al. |
| 5,341,330 A | 8/1994 | Wells et al. |
| 5,689,704 A | 11/1997 | Yoshida et al. |
| 5,950,013 A | 9/1999 | Yoshimura |
| 6,188,650 B1 | 2/2001 | Hamada et al. |
| 6,199,076 B1 | 3/2001 | Logan et al. |
| 6,263,453 B1 | 7/2001 | Anderson |
| 6,282,624 B1 | 8/2001 | Kimura et al. |
| 6,388,961 B1 | 5/2002 | Ijichi |
| 6,427,186 B1 * | 7/2002 | Lin et al. ........................ 711/103 |
| 6,832,293 B1 | 12/2004 | Tagawa et al. |
| 7,099,239 B2 | 8/2006 | Ogikubo |
| 7,139,937 B1 | 11/2006 | Kilbourne et al. |
| 7,234,024 B1 | 6/2007 | Kiselev |
| 7,412,558 B2 | 8/2008 | Oribe et al. |
| 2003/0061189 A1 | 3/2003 | Baskins et al. |
| 2003/0093610 A1 | 5/2003 | Lai et al. |
| 2004/0186946 A1* | 9/2004 | Lee ................................ 711/103 |
| 2005/0015378 A1 | 1/2005 | Gammel et al. |
| 2005/0251617 A1 | 11/2005 | Sinclair et al. |
| 2006/0008256 A1 | 1/2006 | Khedouri et al. |
| 2007/0011445 A1 | 1/2007 | Waltermann et al. |
| 2007/0016721 A1 | 1/2007 | Gay |
| 2007/0073764 A1 | 3/2007 | Oks et al. |
| 2007/0124531 A1* | 5/2007 | Nishihara ......................... 711/3 |
| 2007/0130441 A1 | 6/2007 | Wooten |
| 2007/0204128 A1 | 8/2007 | Lee et al. |
| 2007/0300037 A1 | 12/2007 | Rogers et al. |
| 2008/0104308 A1* | 5/2008 | Mo et al. ....................... 711/103 |
| 2008/0177937 A1 | 7/2008 | Nishihara et al. |
| 2008/0189452 A1 | 8/2008 | Merry, Jr. |
| 2009/0083478 A1 | 3/2009 | Kunimatsu et al. |
| 2009/0150641 A1 | 6/2009 | Flynn et al. |
| 2009/0182962 A1 | 7/2009 | Khmelnitsky et al. |
| 2009/0198902 A1 | 8/2009 | Khmelnitsky et al. |
| 2009/0198947 A1 | 8/2009 | Khmelnitsky et al. |
| 2009/0198952 A1* | 8/2009 | Khmelnitsky et al. ........ 711/206 |
| 2009/0307409 A1 | 12/2009 | Rogers et al. |

FOREIGN PATENT DOCUMENTS

| | | |
|---|---|---|
| WO | WO 94/20906 | 9/1994 |
| WO | WO 2009/100031 | 8/2009 |

OTHER PUBLICATIONS

International Search Report and Written Opinion, dated Jul. 9, 2009, issued in International Application No. PCT/US2009/032886, 20 pages.

(Continued)

*Primary Examiner* — Reba I Elmore
(74) *Attorney, Agent, or Firm* — Meyertons, Hood, Kivlin, Kowert & Goetzel, P.C.

(57) ABSTRACT

Techniques for restoring index pages stored in non-volatile memory are disclosed where the index pages map logical sectors into physical pages. Additional data structures in volatile and non-volatile memory can be used by the techniques for restoring index pages. In some implementations, a lookup table associated with data blocks in non-volatile memory can be used to provide information regarding the mapping of logical sectors into physical pages. In some implementations, a lookup table associated with data blocks and a range of logical sectors and/or index pages can be used.

23 Claims, 11 Drawing Sheets

OTHER PUBLICATIONS

Invitation to Pay Additional Fees and Partial International Search Report, dated May 14, 2009, issued in International Application No. PCT/US2009/032886, 10 pages.

Post et al., "Index Cache Tree", U.S. Appl. No. 12, 509,267, filed on Jul. 24, 2009.

International Search Report and Written Opinion for Application No. PCT/US2010/42696, dated Sep. 14, 2010, 9 pages.

Rogers, et al., "Device Memory Management", U.S. Appl. No. 12/134,998, filed Jun. 6, 2008.

International Search Report/Written Opinion in PCT/US2010/42707 mailed Sep. 7, 2010, 8 pages.

Extended European Search Report for Application No. 10170700.8, dated Nov. 29, 2010 7 pages.

* cited by examiner

RESTORE INDEX PAGE

TECHNICAL FIELD

This subject matter is generally related to memory mapping.

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate. Unfortunately, flash suffers from two limitations. First, bits can only be cleared by erasing a large block of memory. Second, each block can only sustain a limited number of erase operations, after which it can no longer reliably store data. Due to these limitations, complex data structures and algorithms are often required to effectively use flash memories. These algorithms and data structures are used to support efficient not-in-place updates of data, reduce the number of erase operations, and level the wear of the blocks in the device.

Flash memories do not support in-place updates or rewrites to physical memory pages unless the block containing the page is erased first. To overcome this deficiency, a hardware and/or software layer is often added to the flash subsystem. This layer, often referred to as a flash translation layer (FTL), along with the flash memory can mimic a secondary storage device by mapping logical sectors to physical memory pages. For many flash based devices, the FTL is implemented as a controller in hardware. The controller can include a processor or microcontroller along with small amounts of volatile memory (e.g., RAM). The controller can be responsible for translating a read/write request from the file system (e.g., a logical sector) into a read/write operation on a specific block of flash, and initiating "garbage collection" (GC) to erase dirty blocks and reclaim free blocks.

Flash devices can store the mapping of logical sectors to physical memory pages. The FTL can use this stored mapping to identify the physical location of logical sector. If a portion (e.g., a page) of the stored mapping is lost (e.g., data corrupted), the FTL may not be able to translate and perform read/write requests from the file system.

SUMMARY

Techniques for restoring index pages stored in non-volatile memory are disclosed where the index pages map logical sectors into physical pages. Additional data structures in volatile and non-volatile memory can be used by the techniques for restoring index pages. In some implementations, a lookup table associated with data blocks in non-volatile memory can be used to provide information regarding the mapping of logical sectors into physical pages. In some implementations, a lookup table associated with data blocks and a range of logical sectors and/or index pages can be used.

The disclosed index page restoring techniques provide several advantages over conventional index page restoring techniques in flash memory. Some of these advantages include but are not limited to: 1) enabling restoration of a single index page without having to do a full-mount of the file system, and 2) enabling run-time restoration of a missing index page, and 3) eliminating the need to reboot a device in order to restore a lost index page.

DETAILED DESCRIPTION

System Overview

Figure 1A:
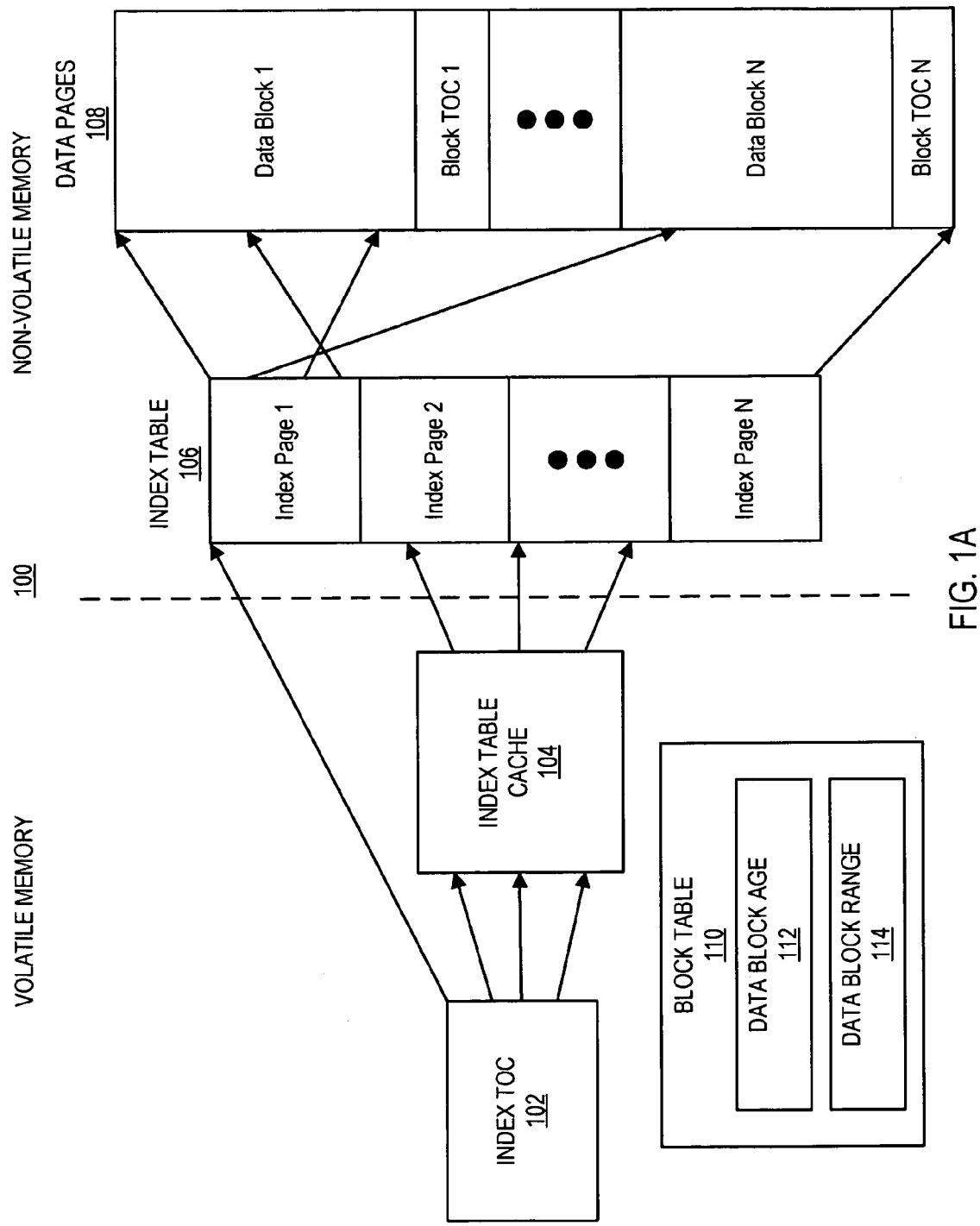
FIG. 1A is a block diagram illustrating an example memory mapping architecture 100 for mapping logical sectors into physical pages using lookup tables.

FIG. 1A is a block diagram illustrating an example memory mapping architecture 100 for mapping logical sectors into physical pages using lookup tables. In some implementations, a lookup table 102 in volatile memory (e.g., RAM) holds the location (e.g., physical address) of a lookup table 106 in non-volatile memory (e.g., flash memory). The lookup table 106 holds the physical addresses of data pages 108. In some implementations, a cache 104 in volatile memory holds the physical addresses of recently written logical sectors to allow faster readout. In the example shown, the lookup table 102 is also referred to as a index TOC 102, the lookup table 106 is also referred to as the index table 106 or index page, and the cache 104 is also referred to as the index table cache 104.

In the architecture 100, the index TOC 102 enables the index table 106 to be stored in the non-volatile memory. This is advantageous since the small amount of RAM that is typically available in controllers cannot be scaled due to a rise in cost, area and power consumption of the controller. In some implementations, the volatile memory can be dynamically configured based on its availability or other trigger events and/or operational modes.

Example Mapping of Logical Sectors by the Index Table 106

The index table 106 is depicted as having example index pages 1-N. Each of the example index pages 1-N maps logical sectors to various data pages 108. The data pages 108 are depicted as being contained in data blocks 1-N. For instance, the example index page 1 maps logical sectors to data block 1 and data block N. If an index page is lost (e.g., page data is corrupted, etc.), the logical sector to data page mappings contained in the index page are also lost. Techniques for restoring the content of a lost index page are described below.

Example Data Block with Block TOC

The data pages 108 are depicted as containing example block TOCs 1-N. Each of the block TOCs is depicted as corresponding to a data block. A block TOC can be stored in the corresponding data block and can include information that maps pages in the block to logical sectors. As described in further detail below, block TOCs associated with data blocks can be used to recreate a lost index page.

Figure 1B:
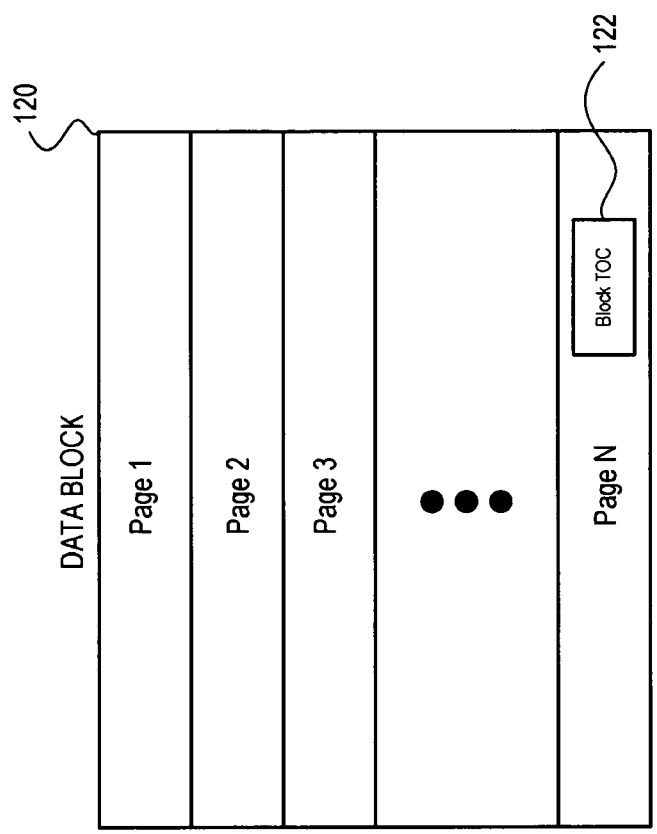
FIG. 1B is a block diagram illustrating an example data block that contains data pages and an associated block TOC.

FIG. 1B is a block diagram illustrating an example data block 120 that contains data pages and an associated block TOC 122. As depicted, the example data block 120 includes data pages 1-N. The block TOC 122 is shown as being a portion of page N. The block TOC 122 can store information mapping the data pages 1-N to corresponding logical sectors.

Example Data Structures in Volatile Memory

In some implementations, a data block can be associated with a block table 110 (also referred to as a block array) stored in volatile memory that can include: a block status data (e.g., free, bad, allocated, current), a valid pages number, an erase count and an error correction code (ECC) fix count. The block table 110 can also include a data block age structure 112 that lists the data blocks from newest (e.g., block most recently written) to oldest (e.g., block least recently written). The block table 110 can additionally include a data block range structure 114 that provides a range (e.g., minimum and maximum) of logical sectors to which each data block corresponds. In some implementations, the data block range structure 114 can provide a range (e.g., minimum and maximum) of index pages in the index table 106 to which each data block corresponds. The data block range structure 114 can be implemented across data block entries in the block table 110.

In some implementations, each entry of the index TOC 102 stores a physical address in non-volatile memory of an index table 106 entry and a pointer to an entry in the index table cache 104. The address 0xff or other suitable indicator can be placed in a index TOC 102 entry to indicate that a desired index table 106 entry is not stored in the index table cache 104.

In some implementations, the following structures need to be allocated in volatile memory (e.g., RAM): a number of free entries in the index table cache, a current data block (e.g., a block that is being used for write or update operations), a pointer to a next free page in the current block, a current block TOC (e.g., a TOC stored in a block that includes information for mapping logical sectors to pages in the block), a current index block (e.g., a block that is being used for index updates), a pointer to a next free page in the index block, a current index block TOC and a number of free blocks.

In some implementations, each entry of the index table cache 104 can include but is not limited to: a buffer to hold data (e.g., a 2K buffer), status data (e.g., clean, dirty, free), a counter (e.g., a serial counter or count indicating how many times that particular block has been accessed).

The data structures described above are examples and other data structures can be used based on the application. The data structures are described in more detail in reference to the other figures.

Example Index Page Restore Operation

Figure 2A:
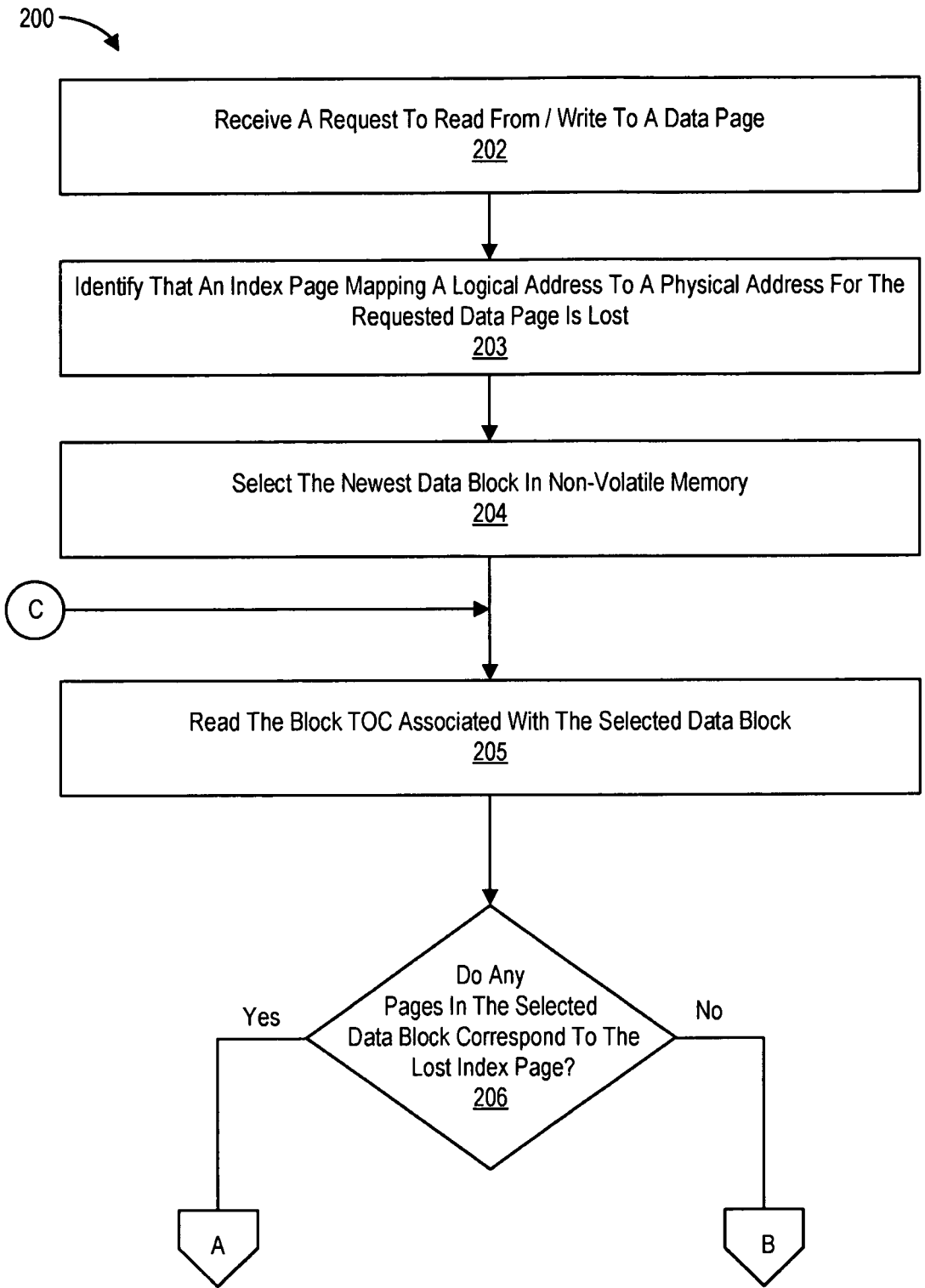
FIGS. 2A-2B are flow diagrams of an example index page restore operation using the memory mapping architecture shown in FIGS. 1A-1B.
Figure 2B:
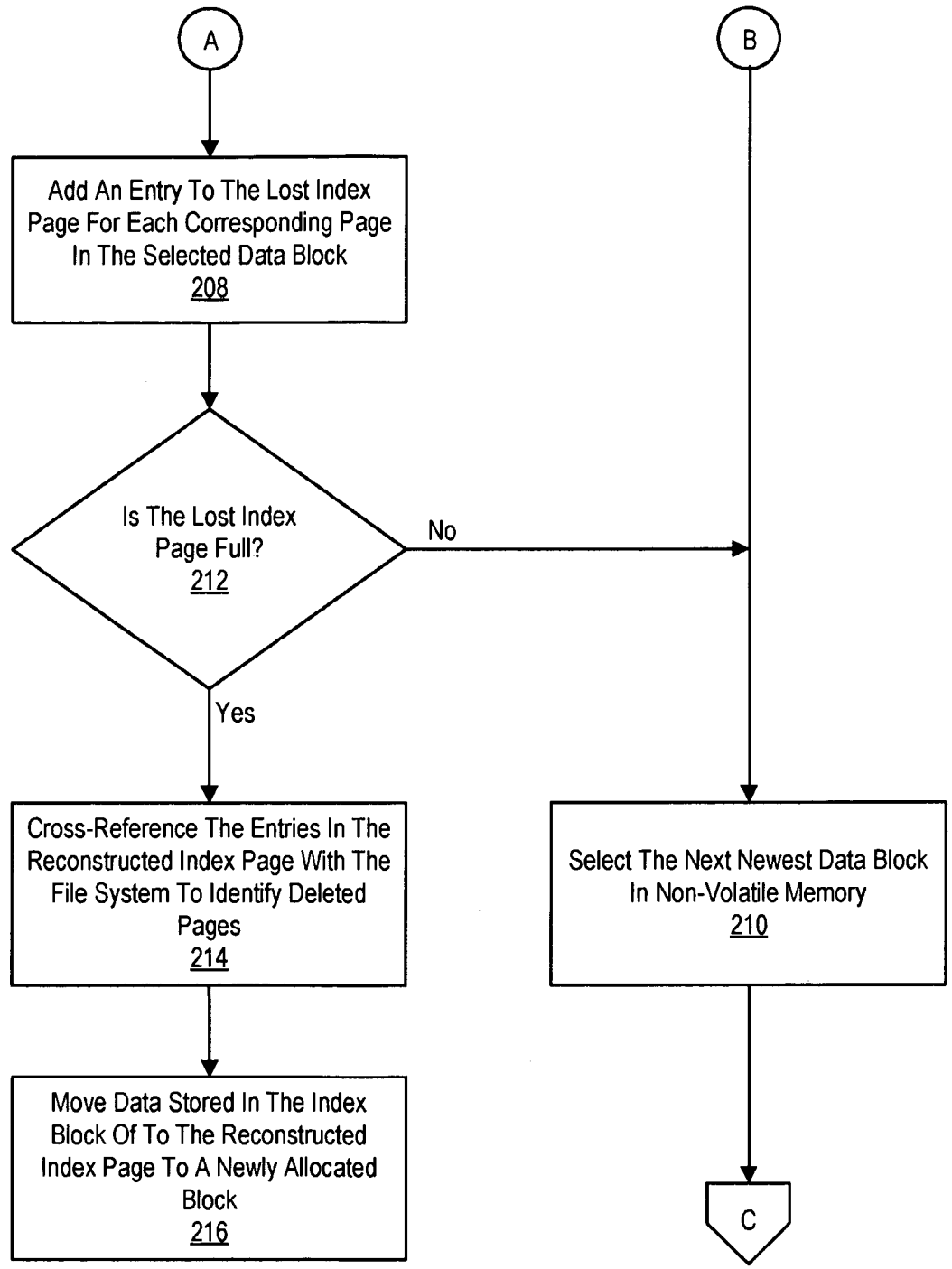

FIGS. 2A-2B are flow diagrams of an example index page restore operation 200 using the memory mapping architecture shown in FIGS. 1A-1B. The operation 200 restores a lost index page using the data page to logical sector mappings contained in block TOCs of data blocks.

Referring to FIG. 2A, in some implementations, the operation 200 can begin by receiving a request to read from or write to a data page in non-volatile memory (202). In an attempt to process the received request, an index table (e.g., the index table 106) can be consulted for the physical address of the requested data page. The index page that contains the logical to physical address mapping for the requested data page can be identified as lost (203). An index page can be identified as lost if the page includes a threshold number of errors (e.g., one error, two errors, etc.). For example, the index page can be identified as lost if an error is contained in the logical to physical address mapping sought in step 202. A variety of error detection techniques can be used, such as a checksum or a cyclic redundancy check (CRC). The newest data block (e.g., the data block most recently written) in non-volatile memory is selected (204) and the block TOC associated with the selected block is read (205). The newest data block can be identified from a structure in volatile memory, such as the data block age structure 112 in the block table 110. If any of the pages in the selected data block correspond to the lost index page (206), then an entry for each corresponding page is added to the lost index page (208). A data page can be determined to correspond to the lost index page if the data page is mapped to by a logical sector contained in the lost index page. The data page to index mapping contained in a block TOC can be referenced to make such a determination.

If the lost index page is not full (e.g., has not been completely reconstructed) after adding the entry (212), or if none of the pages in the selected data block correspond to the lost index page, then the next newest data block in non-volatile memory is selected (210) and the steps 205 and 206 are repeated. This cycle of selecting a data block and comparing its block TOC against the logical sectors of the lost index page is repeated until the lost index page has been fully reconstructed. Once the lost page is full (e.g., reconstructed), the entries in the reconstructed index page can be cross-referenced with the file system to identify deleted (reclaimed) data pages (214). The index page can be responsible for tracking data pages that are free. To ensure that the reconstructed index page accurately lists the free data pages, cross-referencing with the file system can be used. In some implementations, a data block may store metadata (such as in the block TOC) that indicates whether a data page is free or in use.

The data stored in an index block (e.g., a block of index pages in the index table 106) of the reconstructed index page can be moved to a newly allocated block in non-volatile memory (216). An error on an index page can be indicative of a physical problem with the block within which the reconstructed index page resides. Given the importance of index pages to operation of the memory architecture 100, it may be advantageous to move data from a potentially problematic block to a new block in non-volatile memory.

The index page restore operation 200 can be described in pseudo code as follows:

Step 1: Receive notification of an index page to restore.
Step 2: Compare the block TOC for the newest data block to the logical sectors covered by the lost index page.
Step 3: If any pages in the newest data block are covered by the lost index page, then add an entry for each corresponding page to the lost index page.
Step 4: If the lost index page is not full (e.g., the index page has not been fully reconstructed), then repeat steps 2-4 for the next newest data block.

Step 5: If the lost index page is full (e.g., the index page has been fully reconstructed), then cross-reference the reconstructed index page with the file system to identify deleted (reclaimed) pages (optional).

Step 6: Move the data in the index block of the lost index page to a newly allocated block of non-volatile memory (optional).

In some implementations, a brute-force reconstruction can be performed whereby the data blocks and their associated block TOCs are sequentially reviewed to reconstruct a lost page. In contrast, the operation 200 attempts to more efficiently locate the data blocks relevant to a lost index page by searching the data blocks according to the age of the data blocks. The operation 200 may more quickly locate relevant data blocks and, as a corollary, more quickly reconstruct the lost index page than a brute-force approach. Reviewing data blocks in increasing order based on a block's age ensures that the most current copy of each logical sector is available while moving from "newest" to "oldest."

Another Example Index Page Restore Operation

Figure 3A:
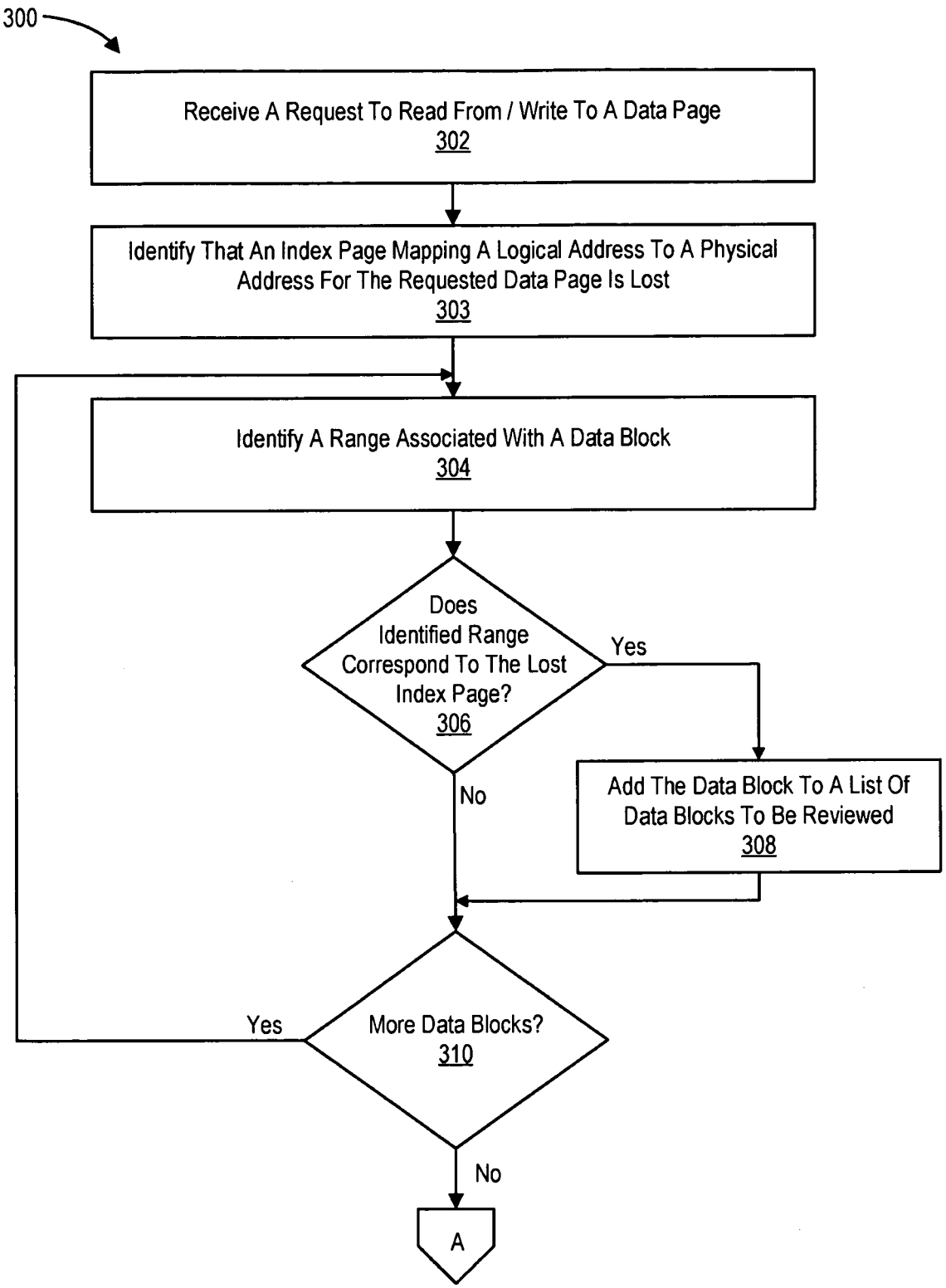
FIGS. 3A-3B are flow diagrams of another example index page restore operation using the memory mapping architecture shown in FIGS. 1A-1B.
Figure 3B:
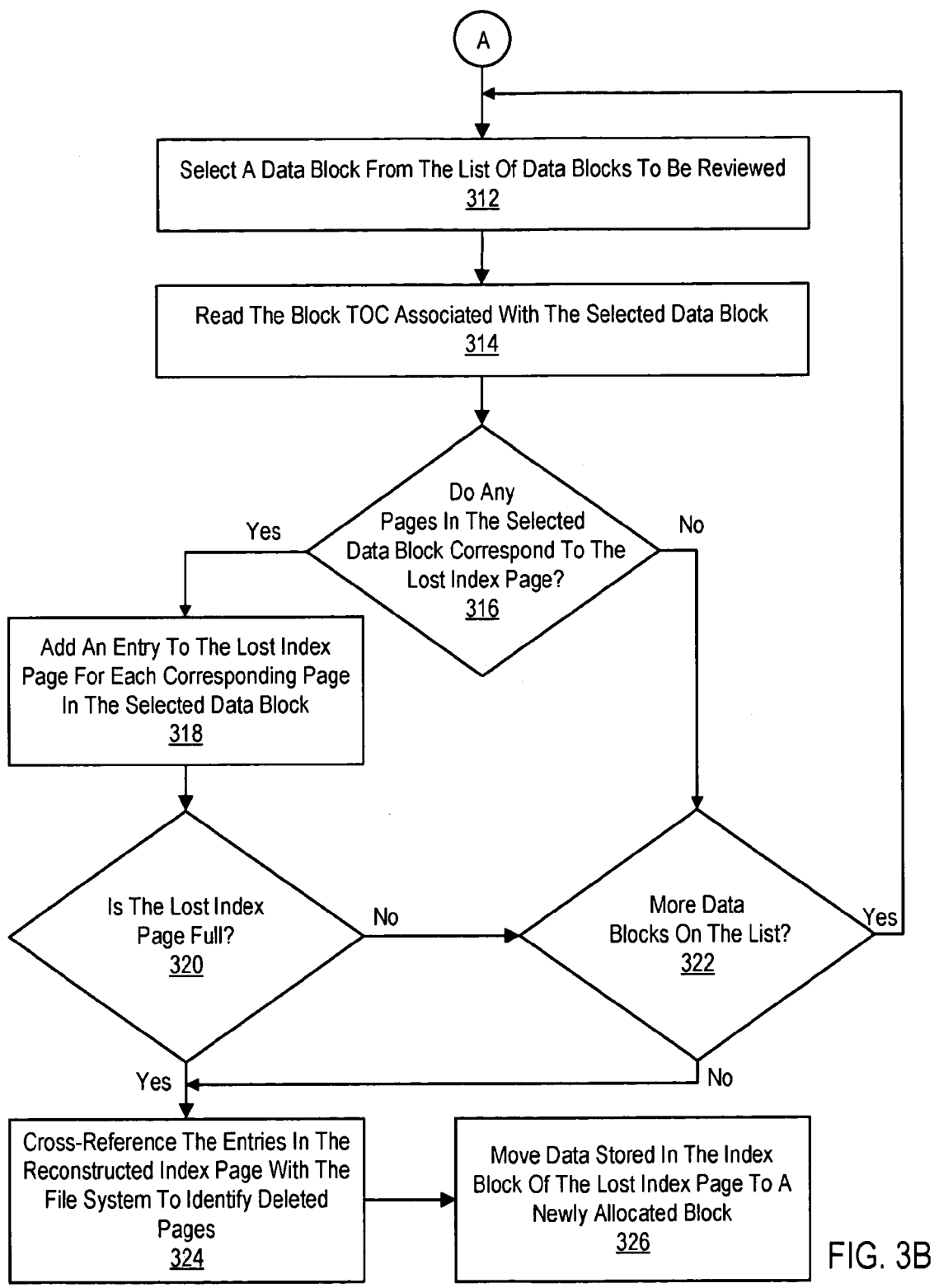

FIGS. 3A-3B are flow diagrams of another example index page restore operation 300 using the memory mapping architecture shown in FIGS. 1A-1B. The operation 300 restores a lost index page using data block to logical sector/index page ranges (e.g., data block range structure 114) and the data page to logical sector mappings contained in block TOCs of data blocks.

Referring to FIG. 3A, in some implementations, the operation 300 can begin by receiving a request to read from or write to a data page in non-volatile memory (302). In an attempt to process the received request, an index table (e.g., the index table 106) can be consulted for the physical address of the requested data page. The index page that contains the logical to physical address mapping for the requested data page can be identified as lost (303), similar to the description of identifying lost index pages as described above with regard to FIG. 2A. A range associated with a data block is identified (304). As described above, the range (e.g., minimum and maximum) can be a range of logical sectors or a range of index pages in non-volatile memory that are covered by the data block. Holes of coverage by the data block within a range can be ignored (e.g., a portion in the middle of the range that is not covered by the data block can be ignored). If the identified range corresponds to the lost index page (306), then the identified data block can be added to a list of data blocks to be reviewed (308). An identified range can correspond to an index page if a logical sector covered by the index page falls within the identified range (if the range cover logical sectors) or if the index page itself falls within the identified range (if the range covers index pages). If there are more data block ranges to compare against the lost index page (310), then the steps 304-310 are repeated. The steps 304-310 can be repeated until a range for each data block has been compared.

Referring to FIG. 3B, a data block is selected from the list of data blocks to be reviewed (312). Similar to a portion of operation 200 described above with regard to FIGS. 2A-2B, a block TOC associated with the selected data block is read (314) and if any of the pages in the selected data block correspond to the lost index page (316), then an entry is added to the lost index page for each corresponding page in the selected data block (318). If the lost index page is not full (e.g., reconstruction is not yet complete) (320) or if none of the pages in the selected data block correspond to the lost index page (316), then the list of data blocks to be reviewed is consulted. If there are more data blocks on the list (322), then the steps 312-322 are repeated. The steps 312-322 can be repeated until the index page has been reconstructed or there are no more data blocks on the list. If the lost index page is full (e.g., no remaining holes in the index) (320) or all data blocks have been scanned (e.g., no more data blocks to examine) (322), then the index restore operation has been completed.

If the lost index page is full (320) or if there are no more data blocks on the list of data blocks to be reviewed (322), then the entries contained in the reconstructed index page can be cross-referenced with the file system to identify deleted pages (324), similar to the cross-referencing described above with reference to FIG. 2B. Data stored in the index block of the lost index page can be moved to a newly allocated block of non-volatile memory (326), similar to the moving of data to a new block described above with regard to FIG. 2B.

The index page restore operation 300 can be described in pseudo code as follows:

Step 1: Receive notification of an index page to restore.
Step 2: Compare the lost index page to a range of logical sectors/index pages for a data block.
Step 3: If the index page falls within the range, then add the data block to a list of data blocks to be reviewed.
Step 4: Repeat steps 2-3 for each data block.
Step 5: Select a data block from the list of data blocks to be reviewed.
Step 6: Compare the block TOC for the selected data block to the logical sectors covered by the lost index page.
Step 7: If any pages in the selected data block are covered by the lost index page, then add an entry for each corresponding page to the lost index page.
Step 8: If the lost index page is not full (e.g., the index page has not been fully reconstructed), then repeat steps 5-8 for the each data block on the list of data blocks to be reviewed.
Step 9: If the lost index page is full (e.g., the index page has been fully reconstructed), then cross-reference the reconstructed index page with the file system to identify deleted (reclaimed) pages (optional).

In some implementations, the restored index page may be moved to another page of non-volatile memory. Data errors that caused the index restore operation to be performed can indicate a physical problem with the memory block within which the index page is stored. The data in the index block of the lost index page can be moved to a newly allocated block of non-volatile memory.

The index page restore operation 300 can provide the following advantages: 1) relevant data blocks can be more quickly identified (e.g., instead of reading block TOCs from non-volatile memory to determine relevance, page ranges from volatile memory can be accessed and compared against the lost index page) and 2) index page restore efficiency can be increased (e.g., only relevant data blocks are read from non-volatile memory).

Example Delayed Index Page Restore Operation

Figure 4:
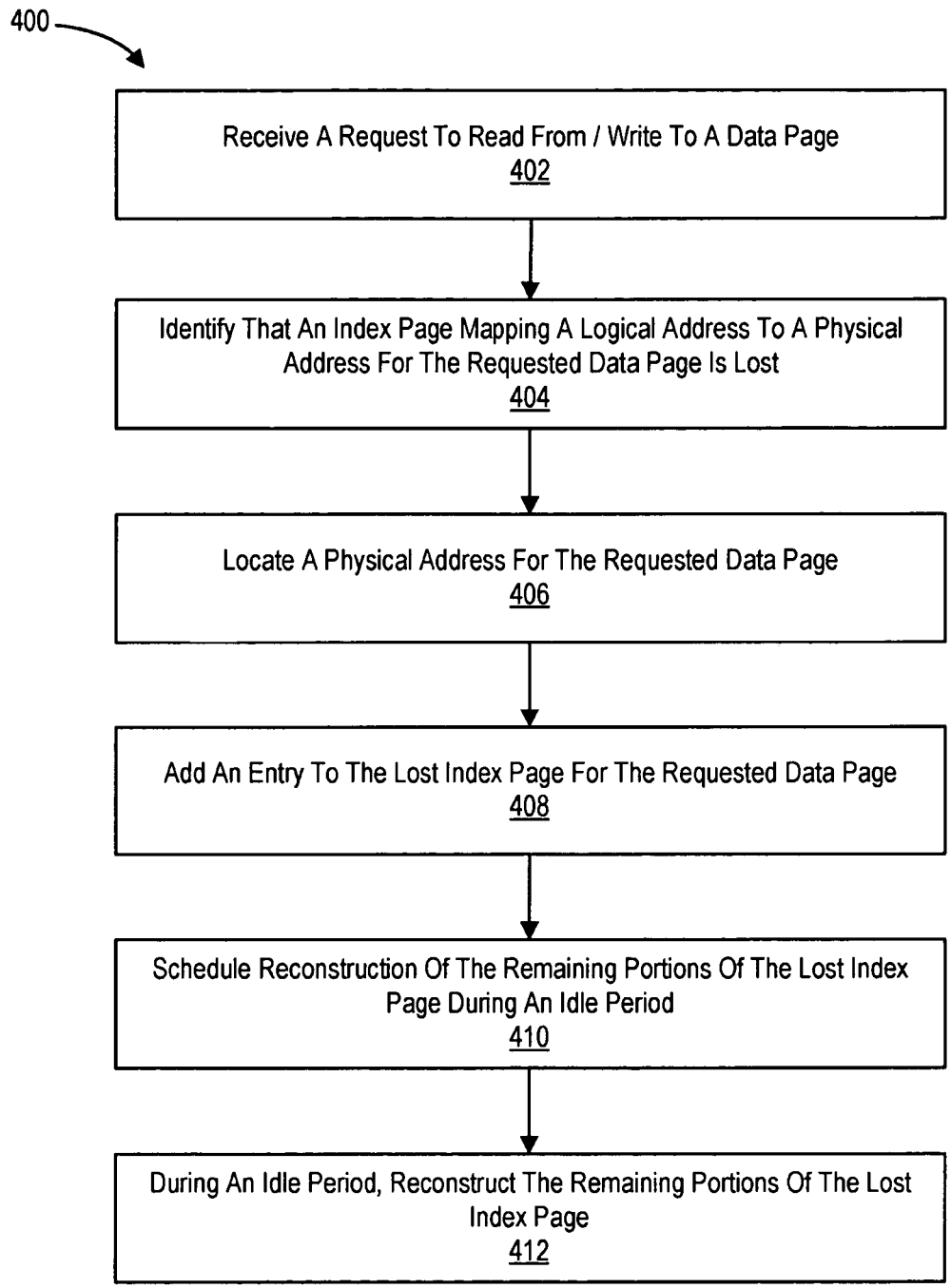
FIG. 4 is a flow diagram of an example delayed index page restore operation using the memory mapping architecture shown in FIGS. 1A-1B.

FIG. 4 is a flow diagram of an example delayed index page restore operation 400 using the memory mapping architecture shown in FIGS. 1A-1B. The operation 400 immediately restores a requested logical sector to data page mapping in a lost index page and then schedules restoration of the index page for a later time when the device is idle.

The operation 400, in some implementations, can begin by receiving a request to read from or write to a data page in non-volatile memory (402). In an attempt to process the received request, an index table (e.g., the index table 106) can be consulted for the physical address of the requested data page. The index page that contains the logical to physical address mapping for the requested data page can be identified as lost (404), similar to the description of identifying lost index pages as described above with regard to FIG. 2A.

The physical address for the requested data page can be located (406) using a variety of index page restore techniques, such as operation 200, operation 300, or the brute-force technique described above. For instance, the index page restore operations 200 and 300, as described above with regard to FIGS. 2A-2B and 3A-3B, could be modified to locate and restore a single entry within a lost index page instead of the entire index page. With the physical address for the requested data page located, an entry for the requested data page can be added to the lost index page (408). Additionally, the received request to read from or write to the requested data page can be performed using the located physical address.

Instead of proceeding to restore the entire index page, reconstruction of the remaining portions of the lost index page can be scheduled for performance during an idle period (410). For example, the flash memory device within which the operation is being performed may be a cell phone, a portable media player, an embedded device, etc. Each of these devices will experience idle time when a user is not actively using them. For instance, a portable media player experiences idle time when it is not playing media (e.g., video, music, etc.) or receiving input from a user. During an idle period, the remaining portions (e.g., the portions not corresponding to the requested data page) of the lost index are reconstructed (412).

In some implementations, reconstruction of the remaining portions of the lost index page is scheduled for a idle period when the flash memory device is either receiving power from an external source (e.g., device is being charged) or when a portable power source is above a threshold level (e.g., battery has over 50% charge). For instance, restoring an index page can be an intensive process for the flash memory device that may reduce the charge of the device.

Reconstruction of an index page can additionally be a time intensive task. By reconstructing only the immediately needed portion of a lost index page, the operation 400 can permit the device performing the operation to process the request and restore the index page at a future time without affecting performance while the device is in use.

Example Memory Subsystems

Figure 5A:
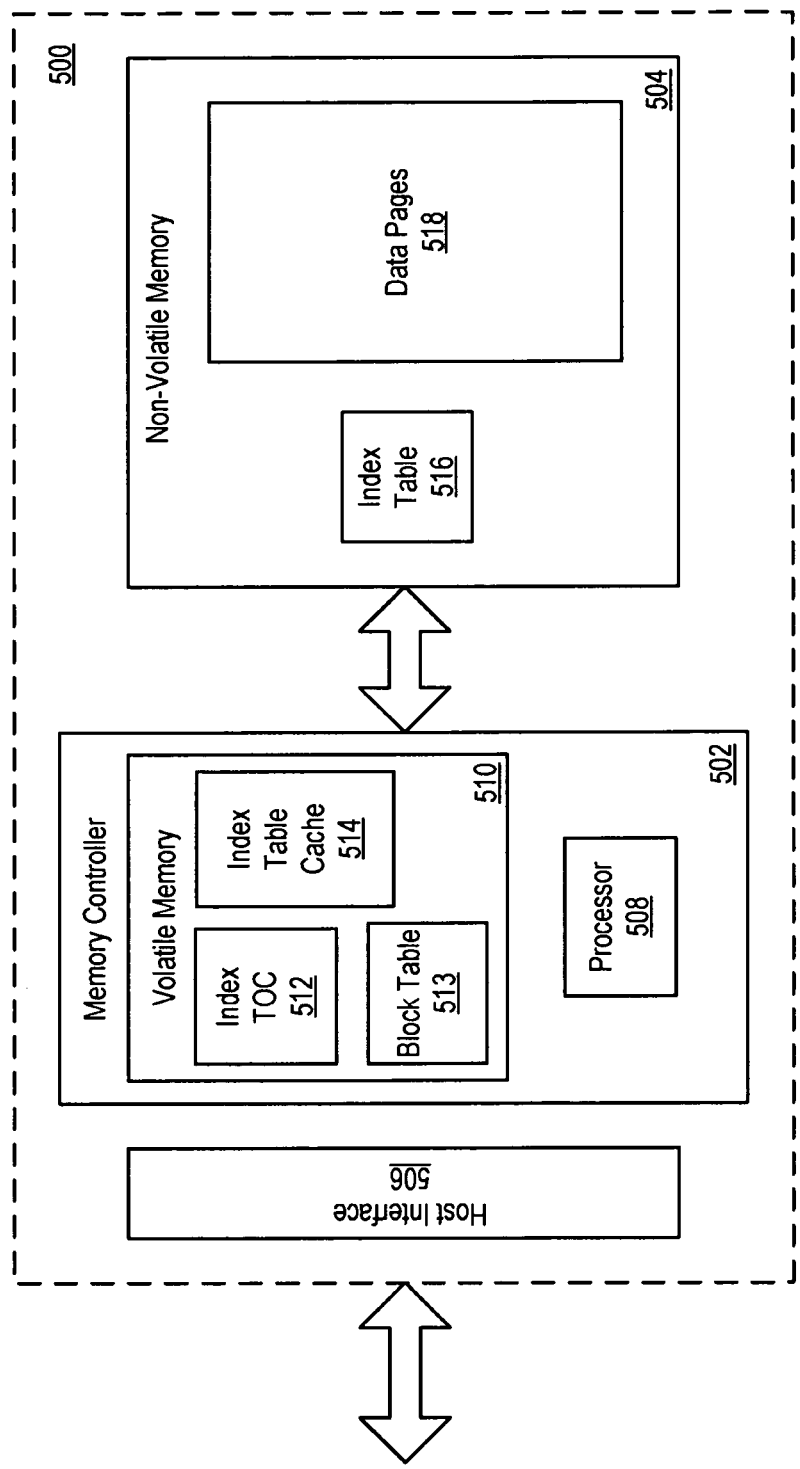
FIG. 5A is a block diagram of example memory subsystem for implementing the memory architecture and operations of FIGS. 1-4 and 6-7.

FIG. 5A is a block diagram of example memory subsystem for implementing the memory architecture and operations of FIGS. 1-4 and 6-7. In some implementations, the subsystem 500 can include a controller 502, non-volatile memory 504 and host interface 506. The controller 502 can include volatile memory 510 (e.g., RAM) and processor 508. The volatile memory 510 stores a block TOC 512, a block table 513 and an index table cache 514. The volatile memory 510 can be configured dynamically by the processor 508 based on availability and any other suitable factors. The non-volatile memory 504 can include an index table 516 and data pages 518. The subsystem 500 can include other components that have been omitted from FIG. 5 for clarity.

In operation, the host interface 506 can obtain read/write requests from a host system over a bus (e.g., IDE/ATT). The host interface 506 can include circuitry and software for receiving data, addresses and control signals. The read/write requests can include a logical sector number and a number of consecutive logical sectors to read/write.

The processor 508 can access the volatile memory 510 and read the index TOC 512 to determine if the index table cache 514 includes physical addresses for the logical sector. If the index table cache 514 includes the physical addresses, then the physical addresses are used for the read/write operation. If the index table cache 514 does not include the physical addresses, then the processor 508 accesses volatile memory 510 to read the index TOC 512 to get the page address of the index table 516 in the non-volatile memory 504. The processor 508 can use the physical addresses in the index table 516 to perform a memory mapping to data pages 518 during the read/write operation. The block table 513 can store the block allocation numbers for blocks which can be used to determine the newest data block. Additionally, the block table 513 can store ranges of logical sectors and/or index pages for data blocks, as described with reference to FIGS. 1A, 2A-2B, and 3A-3B. A variety of techniques can be used to establish the range of logical sectors and/or index pages written in a block. In some implementations, range information for a block can be kept in memory and updated during a block update. In some implementations, range information for a block can be identified by reading out a block TOC and scanning it to determine the range for the associated block.

In some implementations, the data pages 518, index TOC 512 and/or index table 516 can be implemented on one or more different memory devices.

Figure 5B:
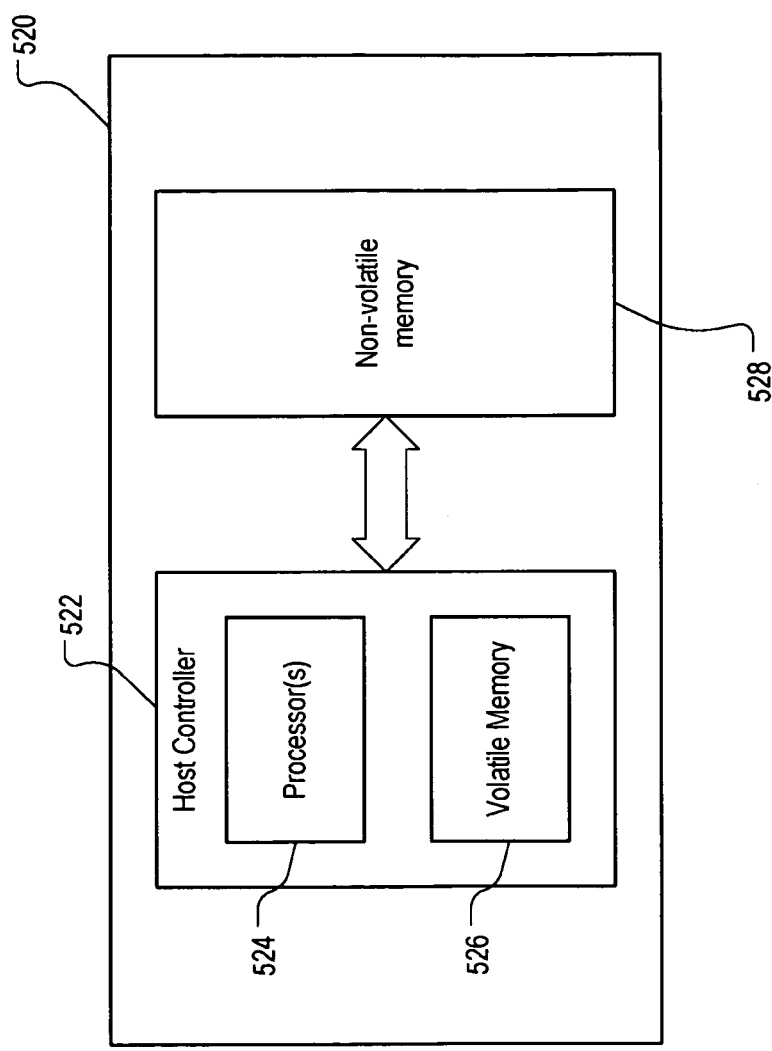
FIG. 5B is a block diagram illustrating the system architecture of an example device including a memory subsystem for implementing the memory architecture and operations of FIGS. 1-4 and 6-7.

FIG. 5B is a block diagram illustrating an example device 520 including a memory subsystem for implementing the memory architecture and operations of FIGS. 1-4 and 6-7. In some implementations, the device 520 is a portable device, such as a media player device, a personal digital assistant, a mobile phone, portable computers, digital cameras, and so on, for example.

The device 520 includes a host controller (or a so-called "System-on-Chip" or "SoC") 522 and non-volatile memory 528. The device 520 can optionally include additional memory external to the host controller 522 and the non-volatile memory 528. The host controller 522 includes one or more processors 524 and volatile memory 526. In some implementations, volatile memory 526 is static random-access memory (SRAM). The host controller 522 performs various processing operations and input/output operations, including the operations described in reference to FIGS. 2-4. For example, the host controller 522 can receive and process user inputs, generate outputs, perform media (e.g., audio, video, graphics) decoding and processing operations, other processing operations, and so on. The host controller 522 can read data from and write data to volatile memory 526. The host controller 522 can also issue read or write operations to the non-volatile memory 528 through an interface (not shown).

In some implementations, the non-volatile memory 528 is NAND flash memory. In some other implementations, the non-volatile memory 528 is another type of non-volatile memory, such as NOR flash memory, other types of solid state memory, or a hard disk drive, for example. The device 520 can also include one or more other components that have been omitted from FIG. 5B for clarity.

Example Index Super Block

Figure 6:
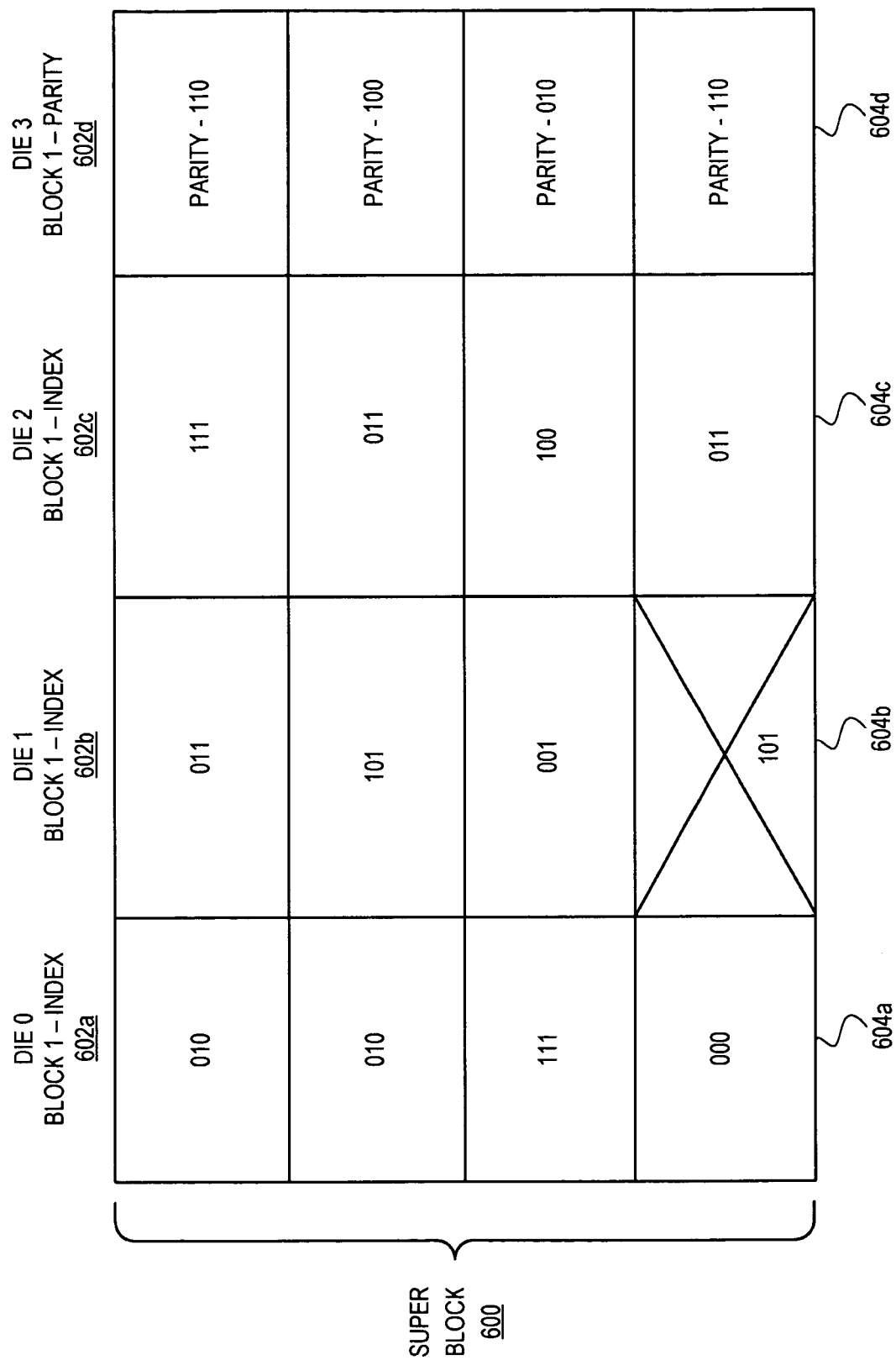
FIG. 6 is a block diagram of an example index super block that can be used to restore a lost index page within the memory architecture described above with regard to FIGS. 1A-1B.

FIG. 6 is a block diagram of an example index super block 600 that can be used to restore a lost index page within the memory architecture described above with regard to FIGS. 1A-1B. The super block 600 can provide a data structure in which a lost index page can be restored without relying on the block TOCs of data blocks.

The super block 600 is composed of blocks 602a-d. In the depicted example, each of the blocks 602a-d is the same block (e.g., block 1) from a different physical die. The first three blocks 602a-c are blocks storing index pages (e.g., index pages from the index table 106). The fourth block 602d is a block that stores parity bits. Performing an XOR operation on stripes of the blocks 602a-c can derive the parity bits that are stored in block 602d. A stripe in a super block includes corresponding bits from each of the blocks. In the depicted example, each row is a stripe. For example, the parity bits for the first stripe are derived by performing the following operation: 010 XOR 011 XOR 111=110.

The parity bits stored in the fourth block 602d can be used to restore a lost index page by performing the same XOR operation on the other blocks in the stripe. For example, in the fourth stripe 604a-c the bits associated with block 1 604b have been lost. Performing an XOR operation using 604a, 604c, and 604d can retrieve the bits. For example, the parity bits 110 were derived by the following operation: 000 XOR 101 XOR 011=110. The bits 604b can be retrieved y performing the same operation using 604a, 604c, and 604d. For instance: 000 XOR 011 XOR 110=101.

The super block 600 is presented for illustrative purposes. Any number of index blocks (e.g., 2, 5, 10, etc.) can be used in conjunction with a block storing parity bits. Additionally, the size of the bits in each stripe can vary (e.g., a word, a double word, a page, etc.). Methods other than parity bits can be used to correct for index page errors, such as using error-correcting code (ECC).

Example Index Page Restore Operation using a Super Block

Figure 7:
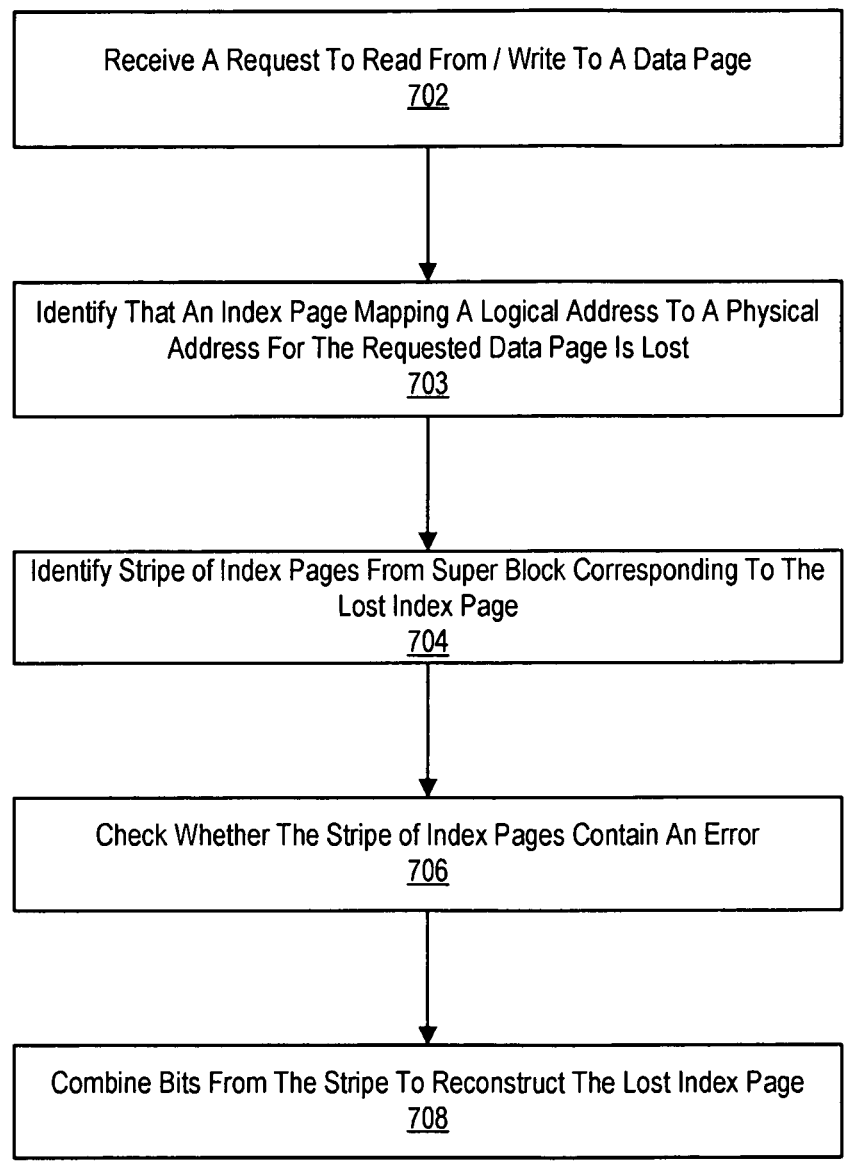
FIG. 7 is a flow diagram of an example index page restore operation using a super block within the memory mapping architecture shown in FIGS. 1A-1B and 6.

FIG. 7 is a flow diagram of an example index page restore operation 700 using a super block within the memory mapping architecture shown in FIGS. 1A-1B and 6. The index page restore operation 700 can restore an index page without having to use the block TOCs contained in data blocks.

The operation 700, in some implementations, can begin by receiving a request to read from or write to a data page in non-volatile memory (702). In an attempt to process the received request, an index table (e.g., the index table 106) can be consulted for the physical address of the requested data page. The index page that contains the logical to physical address mapping for the requested data page can be identified as lost (703), similar to the description of identifying lost index pages as described above with regard to FIG. 2A. A stripe of index pages from a super block corresponding to the lost index page can be identified (704). Referring to the super block depicted in FIG. 6 as an example, if the index page 604b has been lost, the stripe 604a-d can be identified to restore the index page 604b. The other index pages in the stripe can be checked for errors (706). An error in one of the other index pages contained in the stripe can be problematic if using parity bits or another technique (e.g., ECC) for error correction (e.g., parity will not accurately restore an index page if another index page in the stripe has been lost). If one of the other index pages is found to contain an error, then another index page restore operation can be used (e.g., index restore operations 200-400). The bits from the stripe, excluding the lost index page, are then combined (e.g., using an XOR operation) to reconstruct the lost index page (708).

After the index page has been restored, additional steps (not depicted) can be performed to ensure the integrity of the restored index page. Such additional steps can include cross-referencing the file system for deleted pages (this may not be needed depending on how frequently the parity bits are updated) and moving the index block for the lost index page to a newly allocated block of non-volatile memory, similar to the steps described with reference to FIGS. 2B and 3B.

The operation 700 can provide advantages in restoring an index page in that it restores the index page without having to access block TOCs for data blocks in non-volatile memory.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
 receiving a request to restore at least a portion of an index that maps logical sectors to physical pages of memory in a flash memory device;
 reading first metadata associated with a block of memory in the device, wherein the first metadata maps physical pages of the block to logical sectors;
 identifying that a page of the block mapped by the first metadata corresponds to the requested portion of the index; and
 writing an entry corresponding to the identified page to the requested portion of the index.

2. The method of claim 1, further comprising:
 identifying the block of memory from a plurality of blocks of memory based upon how recently each of the plurality of blocks of memory was accessed, wherein the identified block of memory was accessed most recently.

3. The method of claim 1, further comprising:
 identifying the block of memory from a plurality of blocks of memory based upon second metadata that provides a range for each of the plurality of blocks, wherein a range for the identified block of memory corresponds to the requested portion of the index.

4. The method of claim 3, wherein the range provided by the second metadata comprises, for each of the plurality of blocks, a range of logical sectors stored by a block of memory.

5. The method of claim 3, wherein the range provided by the second metadata comprises, for each of the plurality of blocks, a range of index pages that correspond to a block of memory.

6. The method of claim 3, wherein the second metadata is store stored in volatile memory.

7. The method of claim 1, further comprising:
 scheduling a remaining part of the requested portion of the index to be restored when the flash memory device is idle.

8. The method of claim 1, further comprising:
 reading, repeatedly, the first metadata, identifying a logical sector, and writing the identified page until the requested portion of the index has been restored.

9. The method of claim 1, further comprising:
 determining that memory associated with the entry written to the requested portion of the index has been deleted by cross-referencing the entry with a file system that stores information regarding deleted memory; and
 rewriting the entry to the requested portion of the index to indicate the memory associated with the entry has been deleted.

10. The method of claim 1, further comprising:
allocating a new block of memory; and
transferring data from a block of memory associated with the index to the allocated new block of memory.

11. A method comprising:
receiving a request to restore at least a portion of a first index page that maps logical sectors to physical pages of memory in a flash memory device, wherein the first index page is part of a super block that associates the first index page with a second index page and a metadata page;
determining data for the requested portion of the index by combining at least a portion of the second index page and at least a portion the metadata page; and
writing the determined data to the requested portion of the index.

12. The method of claim 11, wherein the first index, the second index, and the metadata are stored on physically different dies of the flash memory device.

13. The method of claim 11, wherein the portion of the second index page and the portion of the metadata page are combined using an exclusive-or (XOR) operation to determine the data for restoring the requested portion of the index.

14. The method of claim 11, wherein the metadata comprises parity information that was previously generated by combining the first index page with the second index page using an XOR operation.

15. A system comprising:
a non-volatile memory;
a controller coupled to the non-volatile memory and configured to:
receive a request to restore at least a portion of an index that maps logical sectors to physical pages of the non-volatile memory;
read first metadata associated with a block of the non-volatile memory, wherein the first metadata is stored in non-volatile memory and maps logical physical pages of the block to logical sectors;
identify that a page of the block mapped by the first metadata corresponds to the requested portion of the index; and
write an entry corresponding to the identified page to the requested portion of the index.

16. The system of claim 15, wherein the controller is further configured to:
identify the block of memory from a plurality of blocks of memory based upon how recently each of the plurality of blocks of memory was accessed, wherein the identified block of memory accessed was most recently.

17. The system of claim 15, wherein the controller is further configured to
identify the block of memory from a plurality of blocks of memory based upon second metadata that provides a range for each of the plurality of blocks, wherein a range for the identified block of memory corresponds to the requested portion of the index.

18. The system of claim 17, wherein the range provided by the second metadata comprises, for each of the plurality of blocks, a range of logical sectors stored by a block of memory.

19. The system of claim 17, wherein the range provided by the second metadata comprises, for each of the plurality of blocks, a range of index pages that correspond to a block of memory.

20. The system of claim 17, further comprising
volatile memory that stores the second metadata.

21. A memory controller for a system including a non-volatile memory, the memory controller comprising:
a host interface; and
a control unit coupled to the host interface, wherein the control unit is configured to:
receive a request from a host through the host interface to restore at least a portion of an index that maps logical sectors to physical pages of the non-volatile memory;
read first metadata associated with a block of the non-volatile memory, wherein the first metadata is stored in non-volatile memory and maps logical physical pages of the block to logical sectors;
identify that a page of the block mapped by the first metadata corresponds to the requested portion of the index; and
write an entry corresponding to the identified page to the requested portion of the index.

22. The system of claim 21, wherein the volatile memory is configured to store an index table cache, an index table of contents (TOC), and a block table.

23. The system of claim 22, wherein the processor is further configured to create a memory map dependent upon physical address information stored in the index table cache.

* * * * *